United States Patent [19]

Bender et al.

[11] 4,263,727
[45] Apr. 28, 1981

[54] SHEET FOR THE MANUFACTURE OF CUSHIONED INSOLES

[75] Inventors: Heinz Bender, Weinheim; Hans-Dietrich Krug, Heidelberg; Klaus Heckel, Weinheim, all of Fed. Rep. of Germany

[73] Assignee: Firma Carl Freudenberg, Weinheim, Fed. Rep. of Germany

[21] Appl. No.: 122,160

[22] Filed: Feb. 19, 1980

Related U.S. Application Data

[63] Continuation of Ser. No. 13,503, Feb. 21, 1979, abandoned.

[30] Foreign Application Priority Data

Feb. 20, 1978 [DE] Fed. Rep. of Germany ... 7805047[U]

[51] Int. Cl.$^3$ ............................................. A43B 13/38
[52] U.S. Cl. ........................................ 36/44; 428/212; 428/213; 428/218; 428/233; 428/246; 428/248; 428/284; 428/287; 428/310; 428/320; 428/322
[58] Field of Search ............... 428/212, 213, 218, 233, 428/246, 248, 284, 287, 310, 315, 320, 322; 36/30 R, 44

[56] References Cited

U.S. PATENT DOCUMENTS

| 4,020,207 | 4/1977 | Alfter et al. | 428/310 |
| 4,035,537 | 7/1977 | Heckel et al. | 428/310 |
| 4,088,805 | 5/1978 | Wiegand | 428/310 |
| 4,091,136 | 5/1978 | O'Brien et al. | 428/310 |
| 4,147,828 | 4/1979 | Heckel et al. | 428/310 |

*Primary Examiner*—James J. Bell
*Attorney, Agent, or Firm*—Sprung, Felfe, Horn, Lynch & Kramer

[57] ABSTRACT

In a sheet for the manufacture of cushioned insoles or of inner soles comprising a substrate and a foamed plastic layer the improvement wherein said substrate comprises a bonded fibrous web flame laminated to the foamed plastic layer which comprises a closed-cell crosslinked polyolefin foam. Advantageously a woven covering layer is flame laminated to the opposite surface of the polyolefin foam which comprises polyethylene and has a density of about 25 to 200 kg/m$^3$ and a thickness of about 1.5 to 15 mm.

4 Claims, 1 Drawing Figure

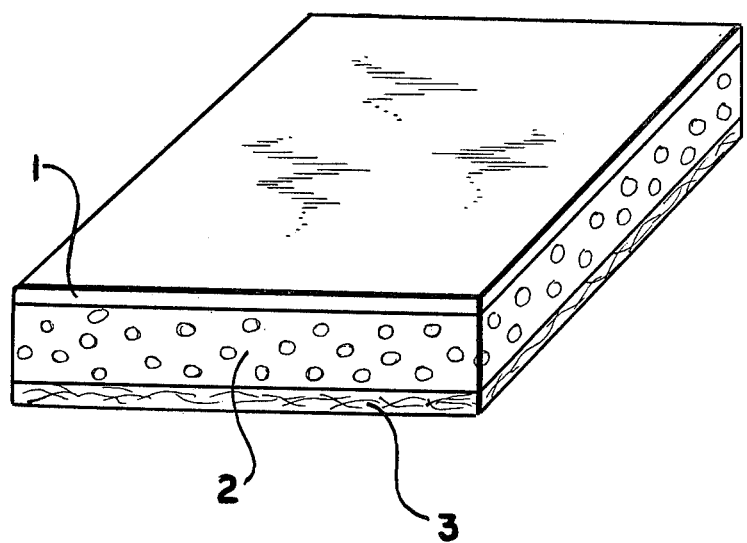

SHEET FOR THE MANUFACTURE OF CUSHIONED INSOLES

This is a continuation of application Ser. No. 13,503, filed Feb. 21, 1979 now abandoned.

The invention relates to a sheet for the manufacture of cushioned insoles which consists of a substrate, a foamed plastic and, optionally, a covering layer, which are joined to one another.

Inner soles having a hard bottom layer of cardboard and a covering layer of an open-cell polyurethane foam which are cemented to each other are known. However, because of the pronounced chemical aging of polyurethane foams, the bond securing the two layers is unable to withstand the churning stresses which arise in use. To counteract the untimely destruction of the bond, the two layers are usually sewn to each other, particularly along the edges. Often additional quilting seams are used over the surface in which an additional fabric may be included. As a result, the cost of manufacture of such inner soles is very high. Apart from their short life expectancy, their utility value is also unsatisfactory orthopedically.

The object of the invention is to provide a sheet for the economic manufacture of cushioned insoles or inner soles which adopts itself with respect to its elasticity automatically to the orthopedic shape of the foot in the various zones and which possesses high resistance to chemical aging.

In accordance with the invention, this object is accomplished by using as substrate a bonded web of natural and/or synthetic fibers, and as foamed plastic a sheet of closed-cell crosslinked polyolefin foam which is fused to the fiber web by flame-laminating.

The shape- and strength-retention properties of the sheet in accordance with the invention are largely determined by the corresponding properties of the substrate. With a view to air conditioning the interior of the shoes while they are being worn, it has proved advantageous to produce the substrate essentially from natural fibers which are bonded to one another by means of a bonding agent. Leather fibers especially have proved themselves particularly well. To provide for good shape retention even when wet, the material may further contain a certain proportion of synthetic and/or inorganic staple fibers. If desired, the material may also have a multilayer structure and may, for example, be provided with a reinforcing insert throughout in the form of a woven fabric or of a nonwoven material.

The inclusion of a bonding agent for strengthening of the fiber web may result in an impairment of the moisture-absorption capacity of the natural fibers, which in many cases is undesirable. To eliminate this deleterious side effect, it has been found advantageous to reinforce the natural-fiber web by means of uniformly distributed embedded binding fibers. The latter may be chemically or thermally activatable.

To secure good bonding to the laminated foamed-plastic layer, it may be advisable, in the case of a fiber web bonded with bonding agent, to grind down its surface before fusing to it the foamed-plastic web formed by the closed-cell crosslinked polyolefin foam. This additional operation is not required when the fiber web is held together by binding fibers.

It has been found particularly advantageous to use as polyolefin foam a polyethylene foam having a bulk density between about 25 and 200 kg/m$^3$, preferably between about 70 and 120 kg/m$^3$, and most preferably about 90 kg/m$^3$. Advantageously the foamed-plastic layer may comprise a plurality of sublayers, one of a density near the bottom of the range and another near the top of the range. A polyethylene foam of this bulk density has an average cell size of about 0.5 mm. It has, and this is of particular importance for the purposes of the invention, excellent adaptability to the orthopedic shape of the human foot with average body weight. The body weight of a human being is known to be transferred differentially from the various regions of the foot to the support. The resulting loads are too great in the region of the ball of the foot, and particularly in the region of the heel, to assure full long-term elasticity of the foamed plastic used, and these regions therefore undergo a slight permanent deformation relative to the other regions. However, a complete collapse of the cells of the plastic foam located in the regions affected does not occur, and it has surprisingly been found that the change in elastic properties which necessarily results has a highly favorable effect on the wearing comfort of appropriate inner soles. The good adaptability of appropriate innner soles which accounts for this is preserved even when the surface of the foamed-plastic sheet is lined with one of the usual covering materials, such as a closed web of a natural or synthetic leather, of a foil, or of a fabric.

Appropriate covering materials may be flame-laminated to the surface of the sheet in accordance with the invention. In accordance with the invention, the costly use of adhesives may therefore be dispensed with. The adverse side effects which frequenctly attend the use of adhesives, such as staining or hardening of the surface, thus are not encountered in a sheet in accordance with the invention.

It has been found particularly advantageous for the foamed-plastic layer to have a thickness between about 1.5 and 15 mm, and preferably between about 4 and 7 mm, especially about 5 mm. While thicker layers also have excellent adaptability, the correspondingly higher surface of such an inner sole which is in direct contact with the underside of the foot may result in an impairment of heat dissipation from the underside of the foot. Such impairment might not be physiologically harmless in every application.

An illustrative embodiment of a sheet for the manufacture of cushioned insoles in accordance with the invention is shown in the accompanying drawing, which is a perspective view. The covering layer is designated 1, the layer of closed-cell crosslinked polyolefin foam is designated 2, and the web of bonded fibrous material is designated 3.

The three layers are joined to one another by means of flame-laminating. The strength obtained is excellent and exceeds in every case the strength of the foamed-plastic layer. Cushioned insoles may be produced from the sheet in accordance with the invention by conventional methods. Inner soles may simply be punched out of the sheet. Edge-stitching for reasons of strength is not required.

In a preferred embodiment the foam is 5 mm thick and comprises closed-cell crosslinked polyethylene of a density of 90 kg/m$^3$, flame-laminated on its upper surface to a woven cotton fabric and on its under surface to a nonwoven web weighing 50 grams/m$^2$ and heat-bonded from a 50—50 weight mixture of nylon 6 and nylon 66 6-denier staple fibers.

It will be appreciated that the instant specification and example are set forth by way of illustration and not limitation, and that various modifications and changes may be made without departing from the spirit and scope of the present invention.

What is claimed is:

1. A shoe including an insole or inner sole cut from a sheet comprising a bonded non-woven fiber backing flame laminated to a closed-cell crosslinked polyethylene foam having a density of about 25 to 200 kg/m$^3$ and a thickness of about 1.5 to 15 mm.

2. A shoe according to claim 1, including a woven covered layer flame laminated to the opposite surface of the foam.

3. A shoe according to claim 1, wherein the foam comprises two bonded sub-layers of different densities.

4. A shoe according to claim 1 wherein the foam has a density of about 90 kg/m$^3$ and a thickness of about 5 mm.

* * * * *